United States Patent
Wan et al.

(10) Patent No.: US 12,005,917 B2
(45) Date of Patent: Jun. 11, 2024

(54) ADVANCED DRIVING SYSTEM AND FEATURE USAGE MONITORING SYSTEMS AND METHODS

(71) Applicant: GM GLOBAL TECHNOLOGY OPERATIONS LLC, Detroit, MI (US)

(72) Inventors: Jingyan Wan, Sterling Heights, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 285 days.

(21) Appl. No.: 17/210,825

(22) Filed: Mar. 24, 2021

(65) Prior Publication Data

US 2022/0306139 A1 Sep. 29, 2022

(51) Int. Cl.
*B60W 50/14* (2020.01)
*G07C 5/08* (2006.01)

(52) U.S. Cl.
CPC ....... *B60W 50/14* (2013.01); *B60W 2050/143* (2013.01); *B60W 2050/146* (2013.01); *B60W 2420/403* (2013.01); *B60W 2552/00* (2020.02); *B60W 2554/40* (2020.02); *B60W 2555/20* (2020.02); *B60W 2756/10* (2020.02); *G07C 5/0825* (2013.01); *G07C 5/0833* (2013.01)

(58) Field of Classification Search
CPC ........... B60W 50/14; B60W 2050/143; B60W 2050/146; B60W 2420/42; B60W 2552/00; B60W 2554/40; B60W 2555/20; B60W 2756/10; G07C 5/0825; G07C 5/0833
See application file for complete search history.

(56) References Cited

U.S. PATENT DOCUMENTS

| | | | |
|---|---|---|---|
| 10,401,191 B2* | 9/2019 | Kim | G01C 21/3676 |
| 2018/0118223 A1* | 5/2018 | Mori | B60W 40/04 |
| 2021/0163017 A1* | 6/2021 | Fredman | B60W 50/10 |
| 2022/0212633 A1* | 7/2022 | Lev | B60S 1/0848 |

FOREIGN PATENT DOCUMENTS

KR   20190041781 A   *  4/2019

OTHER PUBLICATIONS

James M. Fleming et al. Adaptive driver modelling in ADAS to improve user acceptance, 2019 (Year: 2019).*

Leslie, A. J. (2019). *Analysis of the Field Effectiveness of General Motors Production Active Safety and Advanced Headlighting Systems*. University of Michigan, Ann Arbor, Transportation Research Institute.

* cited by examiner

*Primary Examiner* — Elaine Gort
*Assistant Examiner* — Chanmin Park

(57) ABSTRACT

A vehicle system includes: at least one of (a) an advanced driving system configured to aid a driver of a vehicle in performance of at least one driving maneuver based on input from at least one of a sensor and a camera and (b) an advanced driving feature; and a usage module configured to: when the at least one of (a) the advanced driving system and (b) the advanced driving feature is off, determine whether the at least one of (a) the advanced driving system and (b) the advanced driving feature could be on and used based on at least one of: at least one present vehicle operating parameter; at least one present road parameter; at least one present traffic parameter; and at least one present environmental parameter.

8 Claims, 5 Drawing Sheets

ADVANCED DRIVING SYSTEM AND FEATURE USAGE MONITORING SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to usage of advanced driving systems and features of vehicles.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, a vehicle system includes: at least one of (a) an advanced driving system configured to aid a driver of a vehicle in performance of at least one driving maneuver based on input from at least one of a sensor and a camera and (b) an advanced driving feature; a usage module configured to: when the at least one of (a) the advanced driving system and (b) the advanced driving feature is off, determine whether the at least one of (a) the advanced driving system and (b) the advanced driving feature could be on and used based on at least one of: at least one present vehicle operating parameter; at least one present road parameter; at least one present traffic parameter; and at least one present environmental parameter; and when the at least one of (a) the advanced driving system and (b) the advanced driving feature could be on and used, at least one of: display, on a display within a passenger cabin of the vehicle, a visual indicator that the at least one of (a) the advanced driving system and (b) the advanced driving feature could be turned on and used; and output, via at least one speaker, an audible indicator that the at least one of (a) the advanced driving system and (b) the advanced driving feature could be turned on and used.

In further features, the usage module is configured to determine whether the at least one of (a) the advanced driving system and (b) the advanced driving feature could be on and used based on at least two of: the at least one present vehicle operating parameter; the at least one present road parameter; the at least one present traffic parameter; and the at least one present environmental parameter.

In further features, the usage module is configured to determine whether the at least one of (a) the advanced driving system and (b) the advanced driving feature could be on and used based on all of: the at least one present vehicle operating parameter; the at least one present road parameter; the at least one present traffic parameter; and the at least one present environmental parameter.

In further features, a score module is further configured to determine a score value for a first period based on: a second period that the at least one of (a) the advanced driving system and (b) the advanced driving feature was on and used during the first period; and a third period during the first period that the at least one of (a) the advanced driving system and (b) the advanced driving feature could have been on and used during the first period.

In further features, the score module is configured to determine the score value for the first period further based on: a first number of at least one of sensors and cameras providing input to the at least one of (a) the advanced driving system and (b) the advanced driving feature that were clean during the first period; and a total number of sensors and cameras providing input to the at least one of (a) the advanced driving system and (b) the advanced driving feature during the first period.

In further features, the score module is configured to determine the score value for the first period further based on a reduction value associated with the at least one of (a) the advanced driving system and (b) the advanced driving feature being on.

In further features, the score module is configured to determine the score value for the first period further based on: a fourth period that the at least one of (a) the advanced driving system and (b) the advanced driving feature was off during the first period; and a fifth period during the first period that the at least one of (a) the advanced driving system and (b) the advanced driving feature should have been off during the first period.

In further features, the score module is configured to determine the score value for the first period further based on an increase value associated with the at least one of (a) the advanced driving system and (b) the advanced driving feature being off.

In further features, a clean module is configured to, when at least one of at least one of the sensors and the cameras providing input to the at least one of (a) the advanced driving system and (b) the advanced driving feature is not clean, at least one of: display, on the display within a passenger cabin of the vehicle, a second visual indicator to clean the at least one of the at least one of the sensors and cameras providing input to the at least one of (a) the advanced driving system and (b) the advanced driving feature; and output, via at least one speaker, a second audible indicator to clean the at least one of the at least one of the sensors and cameras providing input to the at least one of (a) the advanced driving system and (b) the advanced driving feature.

In further features, the score module is further configured to determine a driver score for the driver of the vehicle based on the score value.

In further features, the score module is configured to determine the driver score based on an average of the score value for the first period and a second score value for a sixth period.

In further features, the score module is configured to transmit the driver score to a remote device.

In further features, the vehicle system further includes: at least one of (a) a second advanced driving system configured to aid a driver of a vehicle in performance of at least one driving maneuver based on input from at least one of a sensor and a camera and (b) a second advanced driving feature; where the usage module is further configured to, determine whether the at least one of the (a) second advanced driving system and (b) the second advanced driving feature could be on and used based on at least one of: at least one second present vehicle operating parameter; at least one second present road parameter; at least one second present traffic parameter; and at least one second present environmental parameter; and when the at least one of the (a) second advanced driving system and (b) the second advanced driving feature could be on and used, at least one of: display, on the display within the passenger cabin of the vehicle, a second visual indicator that the at least one of the (a) second advanced driving system and (b) the second advanced driving feature could be turned on and used; and output, via the at least one speaker, a second audible indicator that the at least one of the (a) second advanced driving system and (b) the second advanced driving feature could be turned on and used.

In further features, a score module is configured to determine a score value for a first period based on: a second period that the at least one of (a) the advanced driving system and (b) the advanced driving feature was on and used during the first period; a third period during the first period that the at least one of (a) the advanced driving system and (b) the advanced driving feature could have been on and used during the first period; a fourth period that the at least one of (a) the second advanced driving system and (b) the second advanced driving feature was on and used during the first period; and a fifth period during the first period that the at least one of (a) the second advanced driving system and (b) the second advanced driving feature could have been on and used during the first period.

In a feature, a method includes: when the at least one of (a) an advanced driving system configured to aid a driver of a vehicle in performance of at least one driving maneuver based on input from at least one of a sensor and a camera and (b) an advanced driving feature is off, determining whether the at least one of (a) the advanced driving system and (b) the advanced driving feature could be on and used based on at least one of: at least one present vehicle operating parameter; at least one present road parameter; at least one present traffic parameter; and at least one present environmental parameter; and when the at least one of (a) the advanced driving system and (b) the advanced driving feature could be on and used, at least one of: displaying, on a display within a passenger cabin of the vehicle, a visual indicator that the at least one of (a) the advanced driving system and (b) the advanced driving feature could be turned on and used; and outputting, via at least one speaker, an audible indicator that the at least one of (a) the advanced driving system and (b) the advanced driving feature could be turned on and used.

In further features, the method further includes determining whether the at least one of (a) the advanced driving system and (b) the advanced driving feature could be on and used based on at least two of: the at least one present vehicle operating parameter; the at least one present road parameter; the at least one present traffic parameter; and the at least one present environmental parameter.

In further features, the method further includes determining whether the at least one of (a) the advanced driving system and (b) the advanced driving feature could be on and used based on all of: the at least one present vehicle operating parameter; the at least one present road parameter; the at least one present traffic parameter; and the at least one present environmental parameter.

In further features, the method further includes determining a score value for a first period based on: a second period that the at least one of (a) the advanced driving system and (b) the advanced driving feature was on and used during the first period; and a third period during the first period that the at least one of (a) the advanced driving system and (b) the advanced driving feature could have been on and used during the first period.

In further features, the method further includes determining the score value for the first period further based on: a first number of at least one of sensors and cameras providing input to the at least one of (a) the advanced driving system and (b) the advanced driving feature that were clean during the first period; and a total number of sensors and cameras providing input to the at least one of (a) the advanced driving system and (b) the advanced driving feature during the first period.

In further features, the method further includes determining the score value for the first period further based on a reduction value associated with the at least one of (a) the advanced driving system and (b) the advanced driving feature being on.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more cameras and/or one or more sensors that can be used by one or more advanced driving systems and/or advanced driving features. Advanced driving systems may aid the driver in performing one or more driving maneuvers, such as lane keeping, lane change assist, speed maintaining, parking, and other types of driving maneuvers. Advanced driving features improve driver safety and facilitate driving of the vehicle. A driver may enable and disable ones of the advanced driving systems and/or features individually or in groups of two or more advanced driving systems and/or features. Advanced driving systems and/or features may reduce a likelihood of damage to people and/or property when they are used under respective predetermined conditions and with clean cameras and/or sensors.

The present application involves a module that determines a score for a trip that is representative of how appropriately a driver had on and used the advance driving systems and/or features given vehicle, road, traffic, and environmental conditions during the trip. The module may generate one or more alerts (e.g., audible, visual, haptic) to use an advanced driving system and/or feature when the advanced driving system and/or feature is off and could be on under the present vehicle, road, traffic, and environmental conditions. The module may also generate one or more alerts (e.g., audible, visual, haptic) to clean a camera and/or a sensor when one or more cameras and/or sensors used by an advanced driving system and/or feature are dirty. The module may also generate one or more alerts (e.g., audible, visual, haptic) to discontinue use of an advanced driving system and/or feature when the advanced driving system and/or feature is on but shouldn't be on given the present vehicle, road, traffic, and environmental conditions.

The module determines scores for trips as described above and below. The module determines a score for a driver of the vehicle based on the scores for the trips, such as by averaging the scores of the trips. The score for the driver can be used in one or more ways, such as to adjust an insurance cost for the vehicle, by a fleet manager, or to notify the driver regarding the driver's score.

Figure 1:
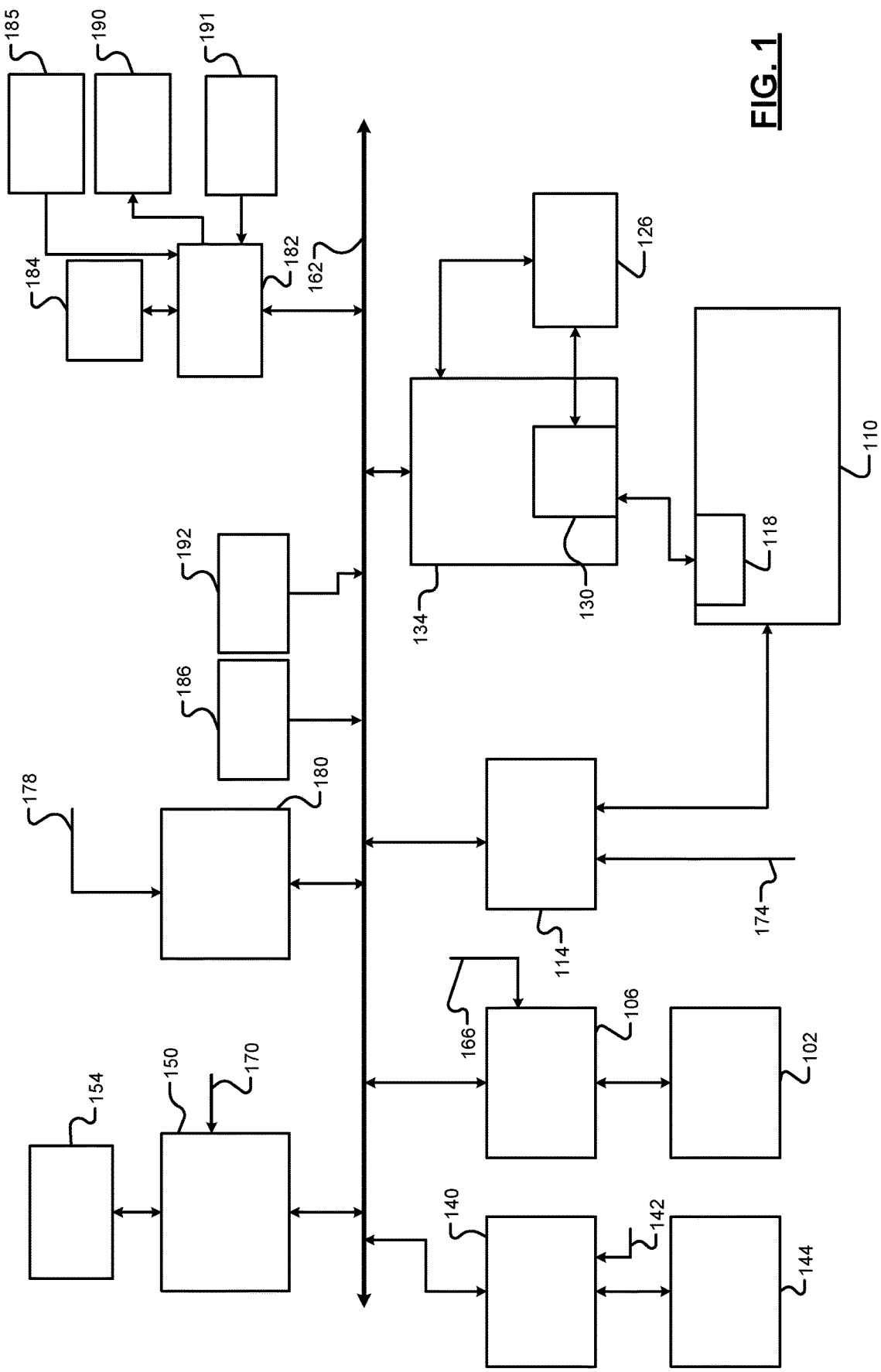
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as an inverter module in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. Modules of the vehicle may share parameters via a network 162, such as a controller area network (CAN) and/or another suitable type of network. The CAN may also be referred to as a car area network. The network 162 may include one or more data buses. Various parameters may be made available by a given control module to other control modules via the CAN 162.

The driver input may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system may include an infotainment module 182. The infotainment module 182 may control what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

The infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

Input from the external sensors and cameras 186 may also be used by one or more advanced driving systems and/or features, such as discussed below, and for one or more other uses.

A global positioning system (GPS) module 191 receives GPS data (e.g., a present location, such as coordinates) from a GPS system. A driver monitoring module 192 monitors one or more characteristics of a driver of the vehicle using one or more in cabin monitoring devices, such as infrared (IR) sensors, cameras, etc. For example, the driver monitoring module 192 may receive input from one or more cameras configured to capture images of the driver and within a passenger cabin of the vehicle, for example, to determine a facial expression, one or more gestures, hand placement, and other driver information based on the images.

Figure 2:
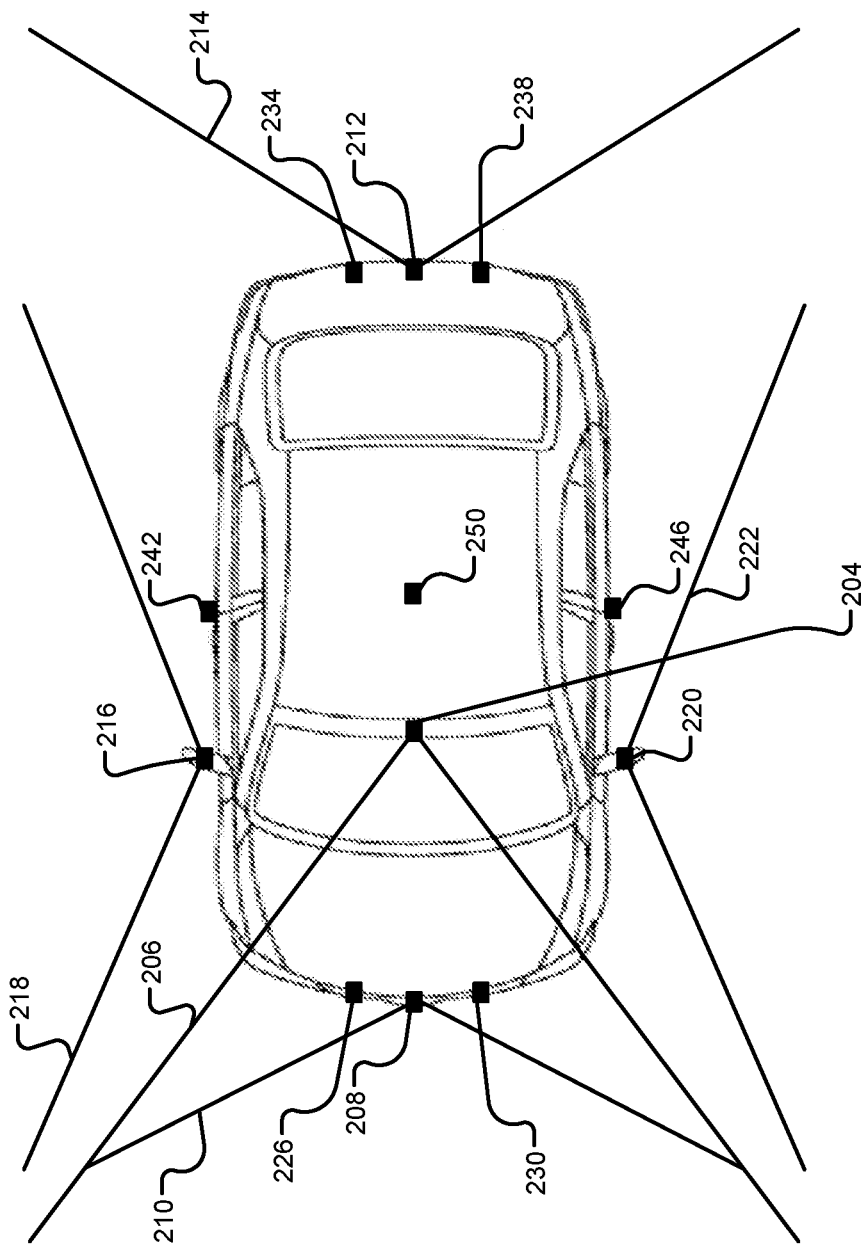
FIG. 2 is a functional block diagram of a vehicle including examples of external sensors and cameras.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to) the vehicle. For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, such as with a rear view mirror within a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate. A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located. A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 also include various other types of sensors, such as radar sensors, a light detection and ranging (LIDAR) sensor 250, etc. For example, the vehicle may include one or more forward facing radar sensors, such as forward facing radar sensors 226 and 230, one or more rearward facing radar sensors, such as rearward facing radar sensors 234 and 238. The vehicle may also include one or more right side radar sensors, such as right side radar sensor 242, and one or more left side radar sensors, such as left side radar sensor 246.

The locations and fields of view of the cameras and radar sensors are provided as examples only and different locations and fields of view could be used. Radar sensors output radar signals around the vehicle. Objects around the vehicle can be detected based on input from the external sensors and cameras 186.

Figure 3:
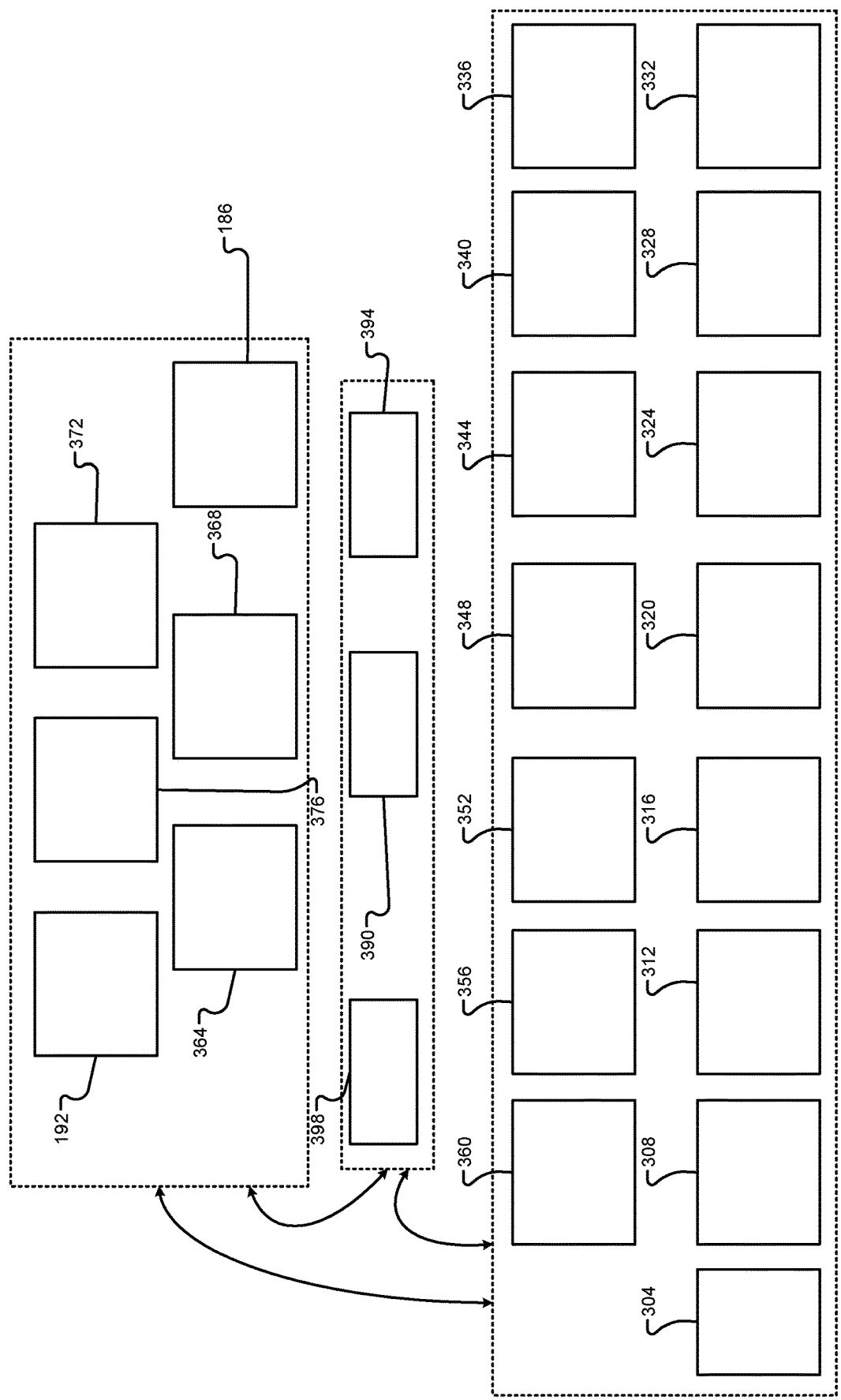
FIG. 3 is a functional block diagram of an example vehicle system.

FIG. 3 is a functional block diagram of an example vehicle system. The vehicle includes one or more advanced driving systems (ADS) and/or advanced driving features. For example, the vehicle may include a forward collision alert (FCA) module 304 configured to provide one or more alerts when one or more predetermined conditions occur. An automatic emergency braking (AEB) module 308 may provide automatic emergency braking of the vehicle when one or more predetermined conditions occur.

A front pedestrian braking (FPB) module 312 may provide braking of the vehicle for one or more pedestrians when one or more predetermined conditions occur. A night vision (NV) module 316 may provide night vision when one or more predetermined conditions occur. A side blind zone alert (SBZA) module 320 may provide one or more side blind zone alerts when one or more predetermined conditions occur.

A lane change alert (LCA) module 324 may provide one or more lane change alerts when one or more predetermined conditions occur. A lane keep assist (LKA) module 328 may adjust steering for lane keeping when one or more predetermined conditions occur. A lane departure warning (LDW) module 332 may provide one or more lane departure alerts/ warnings when one or more predetermined conditions occur.

A rear park assist (RPA) module 336 may adjust one or more actuators for rearward parking when one or more predetermined conditions occur. A front park assist (FPA) module 340 may adjust one or more actuators for forward parking when one or more predetermined conditions occur. A back warning (BW) module 344 may provide one or more backward alerts/warnings when one or more predetermined conditions occur.

A rear cross traffic alert (RCTA) module 348 may provide one or more backward alerts/warnings regarding rear cross traffic when one or more predetermined conditions occur. An automatic parking assist (APA) module 352 may adjust one or more actuators for parking when one or more predetermined conditions occur.

A reverse automatic braking (RAB) module 356 provides braking when one or more predetermined conditions occur while the vehicle is traveling in reverse. A rear pedestrian alert module 360 may provide one or more alerts/warnings regarding rear pedestrians when one or more predetermined conditions occur.

Each advanced driver system and/or feature takes action based on input from one or more sensors and/or cameras of the vehicle. Examples of sensors and cameras include the external cameras and sensors 186, traffic sensors 364, environmental sensors 368, road sensors 372, various vehicle sensors 376, and the inputs to the driver monitor module 192. While examples of advanced driver systems and features are provided, the present application is also applicable to other advanced driver systems and/or features. In various implementations, one or more advanced driver systems and/or features may be omitted.

A usage module 390 monitors whether each advanced driver system is on or off. When an advanced driver system is off, the usage module 390 monitors whether the predetermined conditions for that advanced driver system being on are present. In other words, when an advanced driver system is off, the usage module 390 monitors whether that advanced driver system could be on under the present conditions. If the advanced driver system could be on under the present conditions, the usage module 390 may output one or more alerts to the driver to turn on and use the advanced driver system. Examples of alerts include audible alerts via one or more of the speakers 190, visual alerts via one or more visual indicators, such as the display 184, and haptic alerts via one or more vibrating devices.

When an advanced driver system is on, the usage module 390 monitors whether the predetermined conditions for that advanced driver system being on are present. In other words, when an advanced driver system is on, the usage module 390 monitors whether that advanced driver system should be off under the present conditions. If the advanced driver system should be on under the present conditions, the usage module 390 may output one or more alerts to the driver to turn off and not use the advanced driver system. Examples of alerts include audible alerts via one or more of the speakers 190, visual alerts via one or more visual indicators, such as the display 184, and haptic alerts via one or more vibrating devices.

The usage module 390 therefore encourages use of an advanced driving system and/or feature when the respective predetermined conditions for using the advanced driving system and/or feature are satisfied. The usage module 390 also encourages non-use/non-reliance on an advanced driving system and/or feature when the respective predetermined conditions for using the advanced driving system and/or feature are not satisfied.

A clean module 394 monitors whether sensors and cameras of the vehicle are clean or dirty, such as the exterior cameras and sensors 186. The clean module 394 may output one or more alerts to the driver to clean dirty sensors or cameras when the sensors or cameras are dirty. Examples of alerts include audible alerts via one or more of the speakers 190, visual alerts via one or more visual indicators, such as the display 184, and haptic alerts via one or more vibrating devices.

A score module 398 monitors whether the advanced driving systems and/or feature are on or off when the respective predetermined conditions for the advanced driving systems and/or feature are on are satisfied (such that the respective advanced driving systems and/or features could be on). The score module 398 also monitors whether the advanced driving systems and/or feature are on or off when the respective predetermined conditions for the advanced driving systems and/or features are on are not satisfied (such that the respective advanced driving systems and/or features should be off).

The score module 398 determines a score value for a trip based on a period that an advanced driving system and/or feature was on and being used during the trip, a total period that the advanced driving system and/or feature could have been on and used during the trip, a period that the advanced driving system and/or feature was off during the trip, and a total period that the advanced driving system and/or feature should have been off during the trip. The score module 398 determines the score value for the trip further based on a number of sensors/cameras that are used by the advanced driving system and/or feature that were clean during the trip and a total number of sensors/cameras that are used by the advanced driving system and/or feature. The score module 398 determines the score value for the trip further based on a reduction value indicative of a reduction in a crash rate and/or damage rate associated with the advanced driving system and/or feature being on. The score module 398 determines the score value for the trip further based on an increase value indicative of an increase in a crash rate and/or damage rate associated with the advanced driving system and/or feature being off. The reduction values associated with the advanced driving systems, respectively, and the increase values associated with the advanced driving systems and/or features, respectively, may be predetermined values stored in memory.

The score module 398 may determine the score value for a trip, for example, using one of an equation and a lookup table that relates the above inputs to score values. For example, the score module 398 may determine the score for a trip based on or using the equation:

$$\text{Score} = \frac{1}{N}\sum_{i=1}^{N} f(\%TDASON_i * a\&u_i * \% \ clean_i * ReductionON_i + \%TADASOFF * IncreaseOFF_i),$$

where Score is the score value, N is an integer equal to the number of advanced driving systems and features, $\%TDASON_i * a\&u_i$ is a percentage of time that the i-th advanced driving system or feature was on and being used by the driver during the trip relative to a total period that the i-th advanced driving system or feature could have been on and used by the driver during the trip. $\% \ clean_i$ is the percentage of the sensors/cameras used by the i-th advanced driving system or feature that were clean during the trip relative to a total number of the sensors/cameras used by the i-th advanced driving system or feature (sum of clean and dirty cameras/sensors). ReductionONi corresponds to a reduction rate of collisions/damage if the i-th advanced driving system or feature is on. $\%\ TDASOFF_i$ is a percentage of time that the i-th advanced driving system or feature was off during the trip relative to a total period that the i-th advanced driving system or feature should have been off during the trip. IncreaseOFFi corresponds to an increase rate of collisions/damage if the i-th advanced driving system or feature is off. N is an integer greater than 1. A trip may refer to the period between (a) a time when the vehicle transitioned from off to on and (b) a time when the vehicle next transitioned from on to off.

An example table including conditions under which associated advanced driving systems and features should be off, driver behaviors indicative of use, sensor/camera not clean conditions, and ON reduction values is provided below.

| Advanced Driving Systems and Features | Conditions which system should be off | Driver behavior indicating usage of the systems/features | not clean condition | Reduction ON |
|---|---|---|---|---|
| | | | | Reference: https://www.iihs.org/media/7560e1bf-fcc5-4540-aa16-07444f17d240/A25ptg/HLDI%20Research/Collisions%20avoidance%20features/35.34-compendium.pdf |
| Forward collision alert (FCA) | | Turn on the system/feature | Sensor is blocked by dirt, snow, or ice; if the windshield is | 8.6% |

-continued

| Advanced Driving Systems and Features | Conditions which system should be off | Driver behavior indicating usage of the systems/features | not clean condition | Reduction ON |
|---|---|---|---|---|
| Automatic emergency braking (AEB) | Driving outside of its operating speed range; when weather limits visibility such as in fog, rain, or snow; there is a problem with the electronic stability control (ESC) system | | damaged; in conditions that can limit visibility such as fog, rain, or snow; if the headlamps or windshield are not cleaned or in proper condition | 13.0% |
| Front pedestrian braking (FPB) | Driving outside of its operating speed range; when weather limits visibility such as in nightime, fog, rain, or snow; while towing a trailer | | Sensor is blocked by dirt, snow, or ice; if the headlamps or windshield are not cleaned or in proper condition. | |
| Night vision system | Outside is not dark enough; headlamps are off except when parked; vehicle is not in Park or a forward gear; outside temperature is too high; poor visibility including heavy fog, rain, or snow | | Sensor is blocked by dirt, snow, rain or ice; | |
| Side blind zone alert (SBZA) Lane change alert (LCA) | objects attached to the vehicle such as a trailer, bicycle, or object extending out to either side of the vehicle | | Sensors in the left or right corners of the rear bumper are covered with mud, dirt, snow, ice, or slush, or in heavy rainstorms. | 6.8% |
| Lane keep assist (LKA) | Driving outside of its operating speed range; under poor weather or visibility conditions; on road with unclean lane markings such as construction zones; while towing a trailer | | Windshield, headlamps, or camera sensors are blocked by dirt, snow, or ice | |
| Lane departure warning (LDW) | Under poor weather or visibility conditions | | | 1.2% |
| Rear vision camera (RVC) | | Turn on the system/feature; look at the infotainment display while shifting into R (Reverse) | Sensors are blocked by mud, dirt, snow, ice, or slash | 4.1% |
| Rear park assist (RPA) Front park assist (FPA) | warmer or humid weather | | | |
| Back warning system Rear cross traffic alert (RCTA) | Driving outside of its operating speed range; | | | |
| Automatic parking assist (APA) | Operating outside of its operating speed range; | Turn on the system/feature; look at the infotainment display; shift gears accordingly | | |

-continued

| Advanced Driving Systems and Features | Conditions which system should be off | Driver behavior indicating usage of the systems/features not clean condition | | Reduction ON |
|---|---|---|---|---|
| Reverse automatic braking (RAB) | | Turn on the system/feature; look at the infotainment display while shifting into R (Reverse) | | 29.9% |
| Rear pedestrian alert | Driving outside of its operating speed range; Visibility is poor, including nighttime conditions, fog, rain, or snow | | Rear vision camera is blocked by dirt, snow, or ice; rear vision camera, tail lamps, or back-up lamps are not cleaned or in proper working condition | |

The score module 398 also determines a score value for the driver of the vehicle based on the scores for two or more trips. The score module 398 may determine the score value for the driver using an equation or a lookup table that relates score values for trips to score values for drivers. For example, the score module 398 may set the score value for the driver based on or using the equation:

$$ScoreD = \frac{\sum_{j=1}^{M} Score_j}{M},$$

where ScoreD is the score value of the driver, Scorej is the score value of the j-th trip, and M is an integer greater than 1.

The driver score may be used in one or more ways. For example, the score module 398 may transmit the driver score to a remote device, such as of an insurance carrier of the vehicle, a fleet manager of the vehicle, etc. An insurance carrier may adjust one or more costs associated with insuring the vehicle based on the driver score, such as increasing one or more costs when the driver score decreases and vice versa. A fleet manager of the vehicle may, for example, rate performance of the driver based on the driver score. While example uses of the driver score are provided, other uses are also possible. The score module 398 may additionally or alternatively periodically (e.g., monthly) send the driver score to an address (e.g. email address, mobile phone number, etc.) or a mobile device associated with the driver. This may allow the driver to review his or her driver score and more appropriately use the advanced driving systems and/or features to increase his or her driver score.

Figure 4:
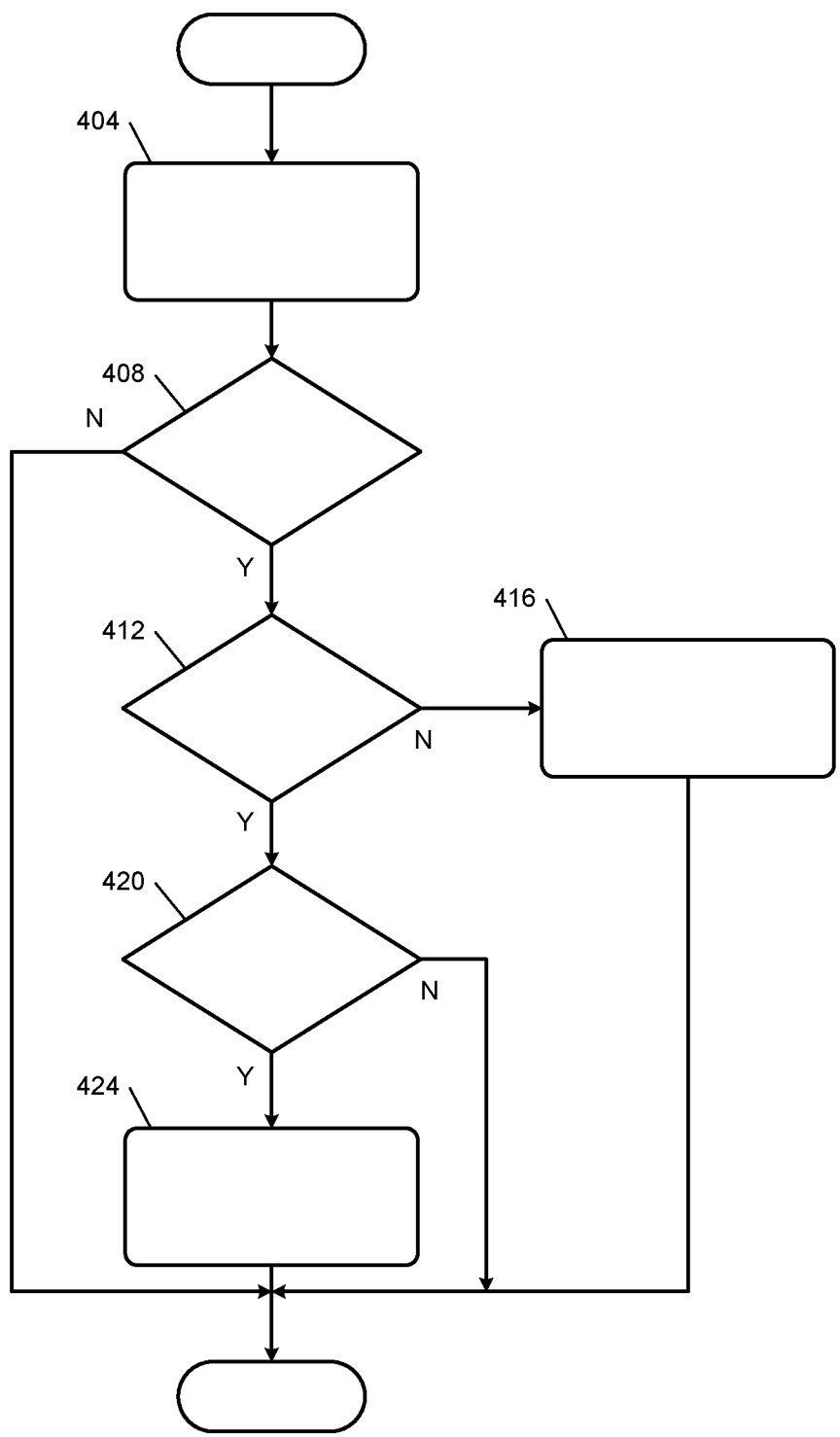
FIG. 4 is a flowchart depicting an example method of selectively alerting a driver to use an advanced driving system or feature of the vehicle.

FIG. 4 is a flowchart depicting an example method of selectively alerting a driver to use an advanced driving system or feature of the vehicle. At 404, the usage module 390 receives the present conditions, such as from the traffic sensors 364, the environmental sensors 368, the external cameras/sensors 186, the road sensors 372, and the vehicle sensors 376.

At 408, the usage module 390 determines whether the advanced driving system or feature is off. If 408 is false, control may end. If 408 is true, control may continue with 412. At 412, the clean module 394 determines whether the cameras and/or sensors used by the advanced driving system or feature are all clean. If 412 is true, control continues with 420. If 412 is false, the clean module 394 outputs one or more alerts to the driver to clean the one or more dirty cameras and/or sensors at 416, and control may end.

At 420, the usage module 390 may determine whether one or more predetermined conditions for using the advanced driving system or feature are present. If 420 is false, the usage module 390 may indicate that usage of the advanced driving system or feature is not proper under the current conditions, and control may end. If 420 is true, the usage module 390 may output one or more alerts (e.g., audible, visual, haptic, etc.) at 424 via one or more output devices to indicate to the driver to use the advanced driving system or feature. While the example of FIG. 4 is shown as ending, control may return to 404. Also, while the example of FIG. 4 is described with respect to one advanced driving system or feature, instances of the example of FIG. 4 may be executed (e.g., in parallel) for each advanced driving system or feature.

Figure 5:
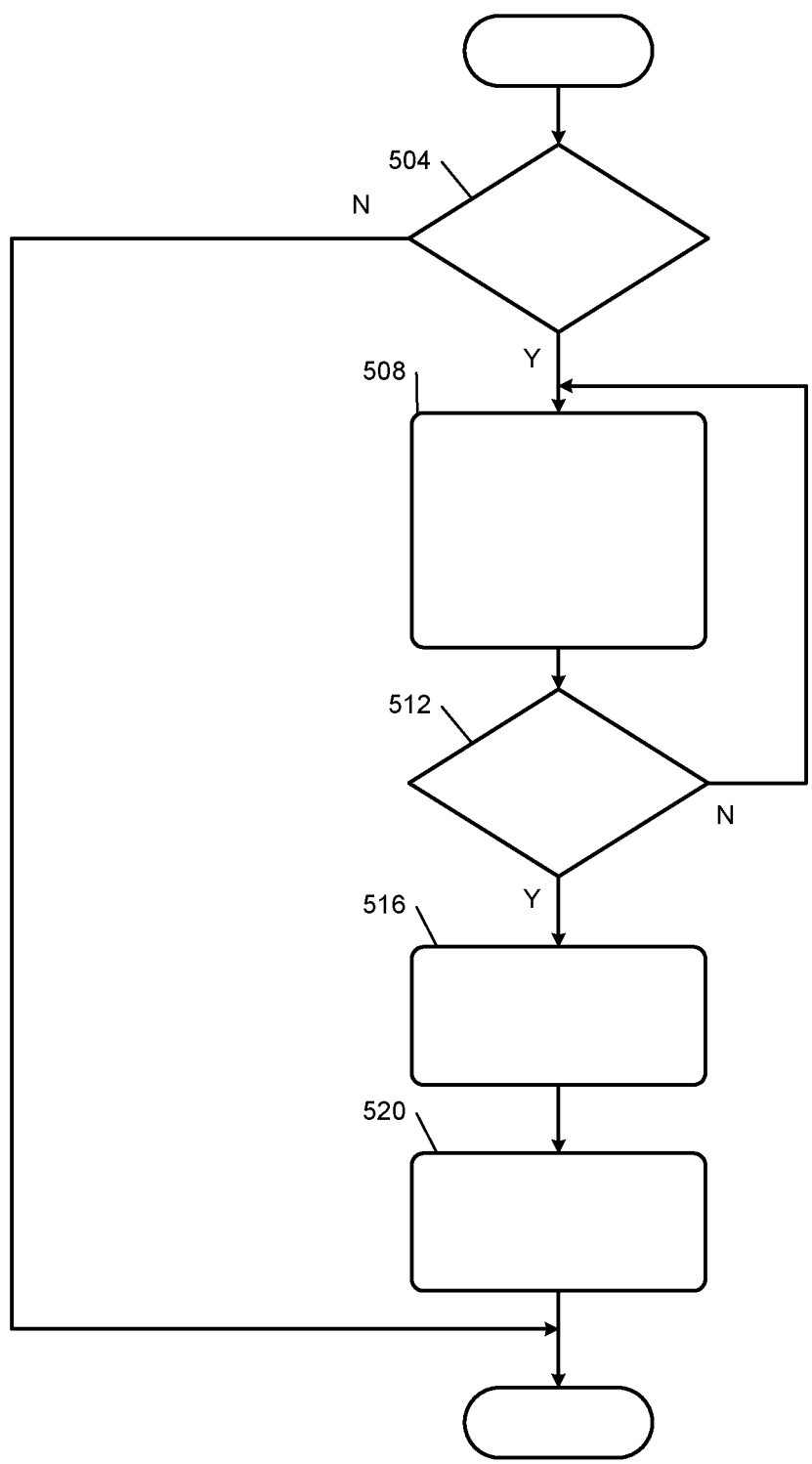
FIG. 5 is a flowchart depicting an example method of determining a trip score and a driver score.

FIG. 5 is a flowchart depicting an example method of determining a trip score and a driver score. Control begins with 504 where the score module 398 determines whether the vehicle has transitioned from off to on. The vehicle may be turned on, for example, via user input to one or more ignition keys, buttons, and/or switches while the vehicle is off. The vehicle may be turned off, for example, via user input to the one or more ignition keys, buttons, and/or switches while the vehicle is on. While examples of vehicle on and off conditions are provided, the present application is also applicable to other ways of turning the vehicle on and off. If 504 is true, control continues with 508. If 504 is false, control may end.

At 508 the usage module 390 records information regarding whether the advanced driving systems and/or features are on and being used or off and whether the advanced driving systems should be on or off given the present conditions, as discussed above. At 512, the score module 398 determines whether the vehicle has transitioned from on to off. If 512 is true, control may continue with 516. If 512 is false, control may return to 508 and continue recording information regarding the advanced driving systems and/or features for the trip.

At 516, the score module 398 determines the trip score, as discussed above, based on the appropriateness of how the driver used and didn't use the advanced driving systems and/or features given the operating conditions. At 520, the score module 398 may update the driver score based on the trip score, as discussed above. While the example of FIG. 5 is shown as ending, control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system, comprising:
at least one of (a) an advanced driving system configured to aid a driver of a vehicle in performance of at least one driving maneuver based on input from at least one of a sensor and a camera and (b) an advanced driving feature;
a usage module configured to:
when the at least one of (a) the advanced driving system and (b) the advanced driving feature is off, determine whether the at least one of (a) the advanced driving system and (b) the advanced driving feature could be on and used based on all of:
at least one present vehicle operating parameter;
at least one present road parameter;
at least one present traffic parameter; and
at least one present environmental parameter; and
when the at least one of (a) the advanced driving system and (b) the advanced driving feature could be on and used, at least one of:
display, on a display within a passenger cabin of the vehicle, a visual indicator that the at least one of (a) the advanced driving system and (b) the advanced driving feature could be turned on and used; and
output, via at least one speaker, an audible indicator that the at least one of (a) the advanced driving system and (b) the advanced driving feature could be turned on and used; and
a score module configured to determine a score value for a first period based on:
a second period that the at least one of (a) the advanced driving system and (b) the advanced driving feature was on and used during the first period; and
a third period during the first period that the at least one of (a) the advanced driving system and (b) the advanced driving feature could have been on and used during the first period,
wherein the score module is configured to determine the score value based on or using the equation:

$$\text{Score} = \frac{1}{N}\sum_{i=1}^{N} f(\% \ TDASON_i * a \ \&u_i * \% \ clean_i * ReductionON_i + \% \ TADASOFF * IncreaseOFF_i).$$

where Score is the score value, N is an integer equal to the number of advanced driving systems and features, % $TDASON_i * a\&u_i$ is a percentage of time that the advanced driving system or feature was on and being used by the driver during the trip relative to a total period that the advanced driving system or feature could have been on and used by the driver during the trip, % $clean_i$ is the percentage of the sensors/cameras used by the advanced driving system or feature that were clean during the trip relative to a total number of the sensors/cameras used by the advanced driving system or feature, ReductionONi corresponds to a reduction rate of collisions/damage if advanced driving system or feature is on, % $TDASOFF_i$ is a percentage of time that the advanced driving system or feature was off during the trip relative to a total period that the advanced driving system or feature should have been off during the trip, and IncreaseOFFi corresponds to an increase rate of collisions/damage if the advanced driving system or feature is off.

2. The vehicle system of claim 1 further comprising a clean module configured to, when at least one of at least one of the sensors and the cameras providing input to the at least one of (a) the advanced driving system and (b) the advanced driving feature is not clean, at least one of:
display, on the display within a passenger cabin of the vehicle, a second visual indicator to clean the at least one of the at least one of the sensors and cameras providing input to the at least one of (a) the advanced driving system and (b) the advanced driving feature; and
output, via at least one speaker, a second audible indicator to clean the at least one of the at least one of the sensors and cameras providing input to the at least one of (a) the advanced driving system and (b) the advanced driving feature.

3. The vehicle system of claim 1 wherein the score module is further configured to determine a driver score for the driver of the vehicle based on the score value.

4. The vehicle system of claim 3 wherein the score module is configured to determine the driver score based on an average of the score value for the first period and a second score value for a sixth period.

5. The vehicle system of claim 3 wherein the score module is configured to transmit the driver score to a remote device.

6. The vehicle system of claim 1 further comprising:
at least one of (a) a second advanced driving system configured to aid a driver of a vehicle in performance of at least one driving maneuver based on input from at least one of a sensor and a camera and (b) a second advanced driving feature;
wherein the usage module is further configured to, determine whether the at least one of the (a) second advanced driving system and (b) the second advanced driving feature could be on and used based on at least one of:
at least one second present vehicle operating parameter;
at least one second present road parameter;
at least one second present traffic parameter; and
at least one second present environmental parameter; and
when the at least one of the (a) second advanced driving system and (b) the second advanced driving feature could be on and used, at least one of:
display, on the display within the passenger cabin of the vehicle, a second visual indicator that the at least one of the (a) second advanced driving system and (b) the second advanced driving feature could be turned on and used; and
output, via the at least one speaker, a second audible indicator that the at least one of the (a) second advanced driving system and (b) the second advanced driving feature could be turned on and used.

7. The vehicle system of claim 6 wherein the score module is configured to determine the score value for the first period further based on:
a fourth period that the at least one of (a) the second advanced driving system and (b) the second advanced driving feature was on and used during the first period; and a fifth period during the first period that the at least one of (a) the second advanced driving system and (b) the second advanced driving feature could have been on and used during the first period.

8. A method, comprising:
when the at least one of (a) an advanced driving system configured to aid a driver of a vehicle in performance of at least one driving maneuver based on input from at least one of a sensor and a camera and (b) an advanced driving feature is off, determining whether the at least one of (a) the advanced driving system and (b) the advanced driving feature could be on and used based on all of:
   at least one present vehicle operating parameter;
   at least one present road parameter;
   at least one present traffic parameter; and
   at least one present environmental parameter;
when the at least one of (a) the advanced driving system and (b) the advanced driving feature could be on and used, at least one of:
   displaying, on a display within a passenger cabin of the vehicle, a visual indicator that the at least one of (a) the advanced driving system and (b) the advanced driving feature could be turned on and used; and
   outputting, via at least one speaker, an audible indicator that the at least one of (a) the advanced driving system and (b) the advanced driving feature could be turned on and used; and
determining a score value for a first period based on:
   a second period that the at least one of (a) the advanced driving system and (b) the advanced driving feature was on and used during the first period; and
   a third period during the first period that the at least one of (a) the advanced driving system and (b) the advanced driving feature could have been on and used during the first period,
wherein determine the score value includes determining the score value based on or using the equation:

$$\text{Score} = \frac{1}{N}\sum_{i=1}^{N} f(\% \ TDASON_i * a\&u_i * \% \ \text{clean}_i * ReductionON_i + \% \ TDASOFF_i * IncreaseOFF_i).$$

where Score is the score value, N is an integer equal to the number of advanced driving systems and features, % $TDASON_i * a\&u_i$ is a percentage of time that the advanced driving system or feature was on and being used by the driver during the trip relative to a total period that the advanced driving system or feature could have been on and used by the driver during the trip, % $\text{clean}_i$ is the percentage of the sensors/cameras used by the advanced driving system or feature that were clean during the trip relative to a total number of the sensors/cameras used by the advanced driving system or feature, ReductionONi corresponds to a reduction rate of collisions/damage if advanced driving system or feature is on, % $TDASOFF_i$ is a percentage of time that the advanced driving system or feature was off during the trip relative to a total period that the advanced driving system or feature should have been off during the trip, and IncreaseOFFi corresponds to an increase rate of collisions/damage if the advanced driving system or feature is off.

* * * * *